United States Patent
Rong et al.

(10) Patent No.: US 8,243,610 B2
(45) Date of Patent: Aug. 14, 2012

(54) SYSTEM AND METHOD FOR PRECODING CODEBOOK ADAPTATION WITH LOW FEEDBACK OVERHEAD

(75) Inventors: Zhigang Rong, San Diego, CA (US); Pengfei Xia, San Diego, CA (US); Yang Tang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 373 days.

(21) Appl. No.: 12/760,038

(22) Filed: Apr. 14, 2010

(65) Prior Publication Data

US 2010/0265841 A1  Oct. 21, 2010

Related U.S. Application Data

(60) Provisional application No. 61/171,138, filed on Apr. 21, 2009.

(51) Int. Cl.
*H04L 12/26* (2006.01)

(52) U.S. Cl. .......................... 370/251; 370/278; 370/329

(58) Field of Classification Search .................. 370/252, 370/278, 329; 375/267, 260
See application file for complete search history.

(56) References Cited

U.S. PATENT DOCUMENTS

| | | | |
|---|---|---|---|
| 2007/0115909 A1* | 5/2007 | Wang et al. | 370/342 |
| 2008/0102768 A1* | 5/2008 | Na et al. | 455/130 |
| 2008/0317145 A1* | 12/2008 | Clerckx et al. | 375/260 |
| 2009/0046569 A1* | 2/2009 | Chen et al. | 370/203 |
| 2009/0080560 A1* | 3/2009 | Na et al. | 375/267 |
| 2010/0054114 A1* | 3/2010 | Li et al. | 370/203 |
| 2010/0238824 A1* | 9/2010 | Farajidana et al. | 370/252 |

OTHER PUBLICATIONS

Huawei, "Adaptive Codebook Designs for MU-MIMO," 3GPP TSG RAN WG1 meeting #56bis, R1-091282, Mar. 23-27, 2009, Seoul, Republic of Korea, 8 pages.

Li, Q., et al., "Transformation method for codebook based precoding," IEEE 802.16 Broadband Wireless Access Working Group, Oct. 31, 2008, pp. 1-6.

* cited by examiner

*Primary Examiner* — Albert T Chou

(74) *Attorney, Agent, or Firm* — Slater & Matsil, L.L.P.

(57) ABSTRACT

A system and method for wireless communications with codebook adaptation with low feedback overhead are provided. A method for controller operations includes receiving a first channel information from a communications device, estimating channel statistics based on the first channel information, adapting a codebook using the channel statistics, and receiving a second channel information from the communications device. The method also includes constructing a precoding matrix from the second channel information and the adapted codebook, and transmitting information precoded by the precoding matrix to the communications device.

24 Claims, 12 Drawing Sheets

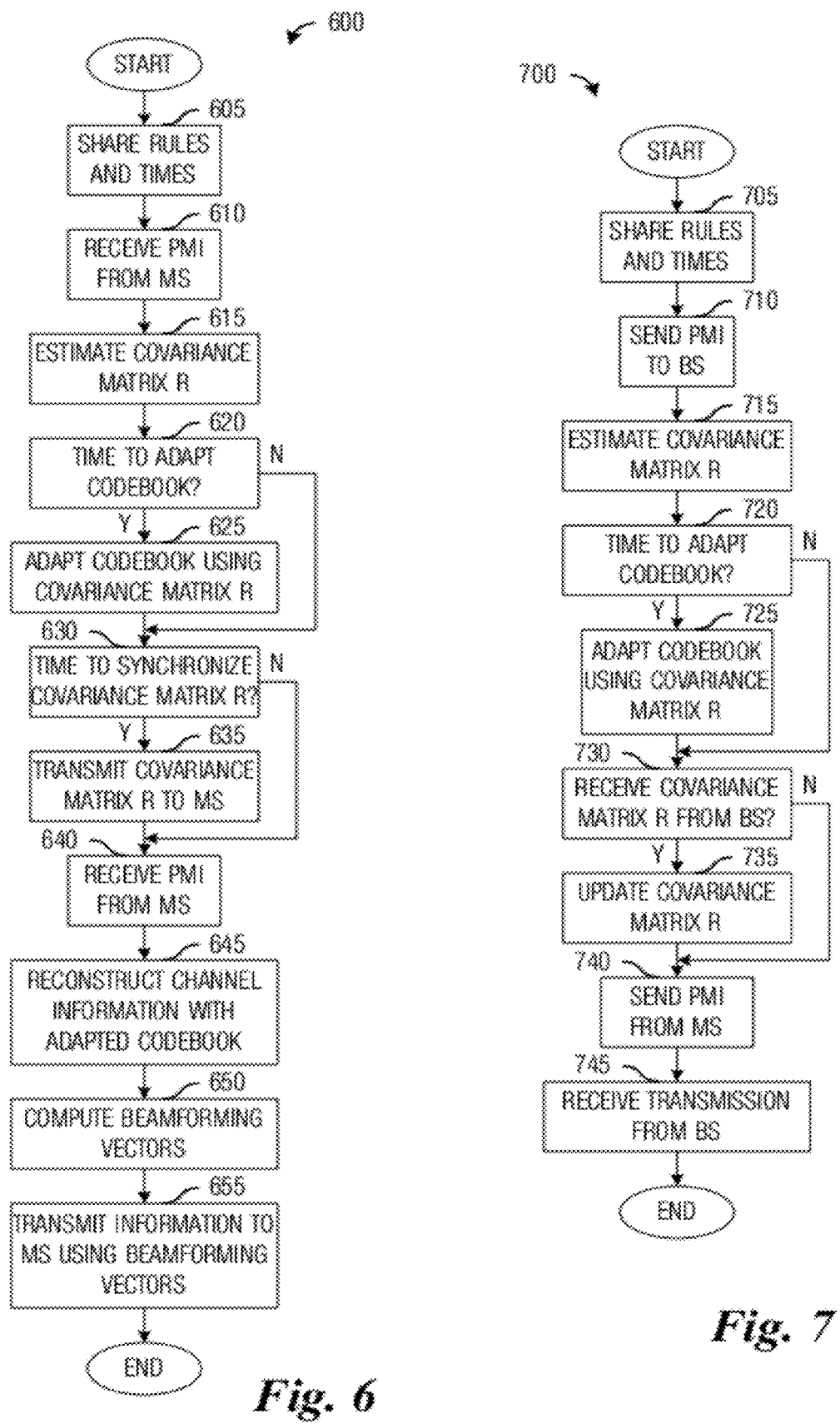

SYSTEM AND METHOD FOR PRECODING CODEBOOK ADAPTATION WITH LOW FEEDBACK OVERHEAD

This application claims the benefit of U.S. Provisional Application No. 61/171,138, filed on Apr. 21, 2009, entitled "Methods for Precoding Codebook Adaptation with Low Feedback Overhead," which application is hereby incorporated herein by reference.

TECHNICAL FIELD

The present invention relates generally to wireless communications, and more particularly to a system and method for wireless communications with codebook adaptation with low feedback overhead.

BACKGROUND

Generally, in a wireless communications system, the communications system's capacity may be significantly improved when a transmitter (also referred to as a base station (BS), NodeB, enhanced NodeB, controller, base terminal station, and so forth) has full or partial knowledge of a channel over which it will be transmitting. Information related to the channel may be referred to as channel state information (CSI). CSI may be obtained by the transmitter over a reverse feedback channel. A receiver (also referred to as a mobile station (MS), user, terminal, User Equipment, and so on) of transmissions made by the transmitter may transmit CSI back to the transmitter over the reverse feedback channel. The receiver may estimate the channel, generate the CSI, and feed the CSI back to the transmitter.

However, since CSI feedback consumes communications system bandwidth, there is a desire to minimize the amount of information being fedback to the transmitter. Reducing the amount of information being fedback may involve the use of techniques such as compression, quantization using codebooks, partial information feedback, and so forth.

Usually, codebook quantization makes use of preferably identical codebooks at the transmitter and the receiver. The codebook contains a number of codewords that are representative of the CSI. Instead of feeding back the CSI, the receiver feeds back an index to a codeword in the codebook based a codeword selection function, wherein the codeword selection function typically chooses a codeword that optimizes some criteria in consideration of the CSI.

It has been realized that codebooks should be designed to match the underlying channel characteristics. For example, for SU-MIMO independent identically distributed (iid) Rayleigh fading channels, Grassmannian line/subspace packing (GLP) based codebook has been shown to achieve near optimal performance. On the other hand, those GLP codebooks perform not so well under spatially correlated fading channels, wherein other codebooks have been shown to be relatively more robust, e.g., discrete Fourier transform (DFT) based codebooks and Householder based codebooks, among others. Other examples of codebooks may be complex Hadamard transform (CHT) based codebooks.

Codebook adaptation allows for the adjustment of a base codebook to meet actual communications system operating conditions. Therefore, instead of storing multiple codebooks at both the transmitter and the receiver, which may consume considerable storage space, only a single base codebook may need to be stored at the transmitter and the receiver. The base codebook may be adapted to meet actual communications system operating conditions, which may yield better performance than using statically configured codebooks.

SUMMARY

These technical advantages are generally achieved, by embodiments of a system and method for wireless communications with codebook adaptation with low feedback overhead.

In accordance with an embodiment, a method for controller operations is provided. The method includes receiving a first channel information from a communications device, estimating channel statistics based on the first channel information, adapting a codebook using the channel statistics, and receiving a second channel information from the communications device. The method also includes constructing a precoding matrix from the second channel information and the adapted codebook, and transmitting information to the communications device, wherein the information is precoded using the precoding matrix.

In accordance with another embodiment, a method for communications device operations is provided. The method includes sending a first channel information to a controller, adapting a codebook based on a first channel statistics, and sending a second channel information to the controller. The second channel information is quantized using the adapted codebook. The method also includes receiving a transmission from the controller. The transmission has been precoded using a precoding matrix and an adapted codebook computed based on the first channel information.

In accordance with another embodiment, a controller is provided. The controller includes a receiver coupled to an antenna, a transmitter coupled to the antenna, a feedback information compute unit coupled to the receiver, and a beamforming vector unit coupled to the feedback information compute unit. The receiver receives signals detected by the antenna and the transmitter transmits signals using the antenna. The feedback information compute unit estimates channel statistics based on feedback information received from a communications device, adapts a codebook based on the channel statistics, and reconstructs channel information from the feedback information. The beamforming vector unit computes a precoding matrix from the feedback information.

An advantage of an embodiment is that the amount of feedback overhead needed to ensure that identical codebooks are used at both the transmitter and the receiver is reduced. The reduction in feedback helps to improve overall communications system performance.

A further advantage of an embodiment is that the reduction in feedback overhead allows for implementation of adaptive codebooks in communications systems with limited feedback bandwidth.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 6 is a flow diagram of BS operations in transmitting information to MSs;

FIG. 7 is a flow diagram of MS operations in receiving a transmission from a BS;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system that makes use of channel state information to improve communications performance, such as communications systems compliant with the Third Generation Partnership Project (3GPP) Long Term Evolution (LTE) technical standards. The invention may also be applied, however, to communications systems adherent to other technical standards that allow the use of channel information feedback to improve communications performance, such as LTE-Advanced, WiMAX, and so forth.

Figure 1:
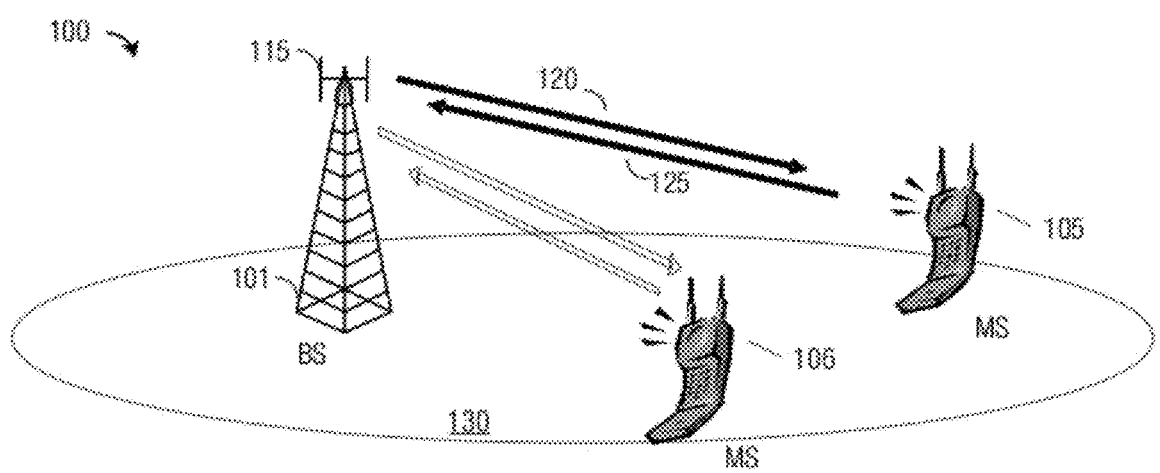
FIG. 1 is a diagram of a communications system.

FIG. 1 illustrates a communications system 100. Communications system 100 includes a BS 101 and a MS 105 and MS 106, which may be mobile or fixed. BS 101 and MS 105 and MS 106 may communicate using wireless communications. BS 101 has a plurality of transmit antennas 115, while MS 105 and MS 106 may have one or more receive antennas. BS 101 sends control information and data to MS 105 through downlink (DL) channel 120, while MS 105 sends control information and data to BS 101 through uplink (UL) channel 125. BS 101 and MS 106 may also communicate over similar channels.

MS 105 may send control information on UL channel 125 to improve the quality of the transmission on DL channel 120. BS 101 may send control information on DL channel 120 for the purpose of improving the quality of uplink channel 125. A cell 130 is a conventional term for the coverage area of BS 101. It is generally understood that in communications system 100 there may be multiple cells corresponding to multiple BSs, as well as multiple MSs.

Communications devices in communications system 100 may make use of codebook quantization to help reduce feedback overhead as the MSs feedback control information over UL channels to the BSs. Additionally, the communications devices in communications system 100 may utilize codebook adaptation to adjust the codebooks used for codebook quantization to meet changing operating conditions rather than storing a number of statically defined codebooks.

Figure 2A:
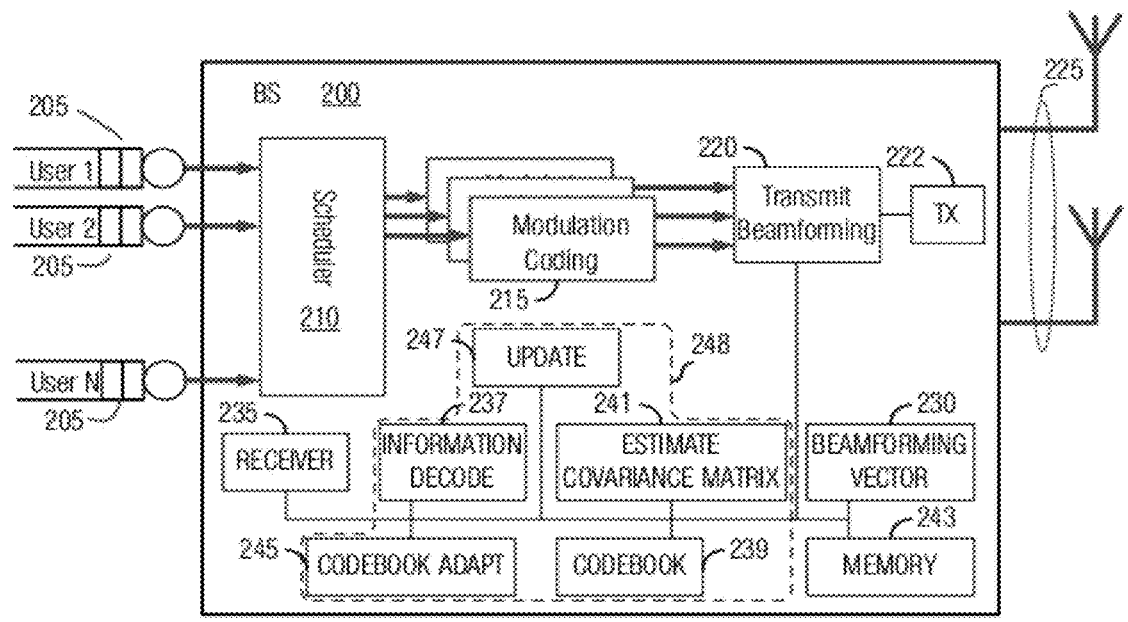
FIG. 2a is a diagram of a BS that makes use of channel statistics to compute beamforming vectors.

FIG. 2a illustrates a BS 200 that makes use of channel statistics to compute beamforming vectors. Data 205 destined for a plurality of MSs being served by BS 200, in the form of bits, symbols, or packets, for example, may be sent to a scheduler 210, which may decide which UEs will transmit or receive in a given time/frequency opportunity. Scheduler 210 may use any of a wide range of known scheduling disciplines in the literature including round robin, maximum sum rate, proportional fair, minimum remaining processing time, or maximum weighted sum rate. Generally scheduling decisions are based on channel quality information feedback (in the form of channel quality indicators or other short term information, for example) fedback from a plurality of MSs.

Data from MSs selected for transmission may be processed by a modulation and coding block 215 to convert the data to transmitted symbols. Modulation and coding block 215 may also add redundancy for the purpose of assisting with error correction and/or error detection. A modulation and coding scheme implemented in modulation and coding block 215 may be chosen based in part on information about the channel quality information feedback (in the form of channel quality indicators or other short term information).

The output of modulation and coding block 215 may be passed to a transmit beamforming block 220, which maps the output (a modulated and coded stream for each MS) onto a beamforming vector. The beamformed outputs may be coupled to antennas 225 through RF circuitry, such as a transmitter (TX) 222. Although shown in FIG. 2a as having only two antennas, it should be understood that BS 200 may have any number of antennas. The transmit beamforming vectors are input from a beamforming vector compute unit 230.

Beamforming vector compute unit 230 produces beamforming vectors from the channel information feedback or from sounding signals received from the MSs. For example, in time division duplexed (TDD) communications systems, channel reciprocity may be utilized to compute beamforming vectors based on sounding signals transmitted by MSs. While, in frequency division duplexed (FDD) communications systems, where channel reciprocity may not be utilized, and in communications systems not using channel reciprocity, channel information feedback from the MSs may be used to compute beamforming vectors.

Channel information feedback may be received at receiver 235. As discussed previously, channel information feedback received at BS 200 may be in a raw form as measured and computed by the MSs, an encoded form, a quantized form, a compressed form, or so forth. Encoding, quantizing, compressing, and so on, may be used to reduce the amount of channel information being fedback by the MSs, which may help to improve overall performance of the communications system by reducing feedback overhead.

The channel information feedback received by receiver 235 may be decoded by information decode unit 237. For example, if the channel information is quantized using codebook quantization, thereby represented by a codeword index, information decode unit 237 may recover a quantized version of the channel information by referencing a codebook stored in codebook store 239 based on the codeword index. As another example, the channel information feedback received by receiver 235 may be in the form of a precoding matrix indicator (PMI), which may be coded to help protect the channel information feedback from transmission errors. Information decode unit 237 may decode the channel information feedback and correct errors if errors are detected.

The quantized version of the channel information may be provided to an estimate covariance matrix unit 241, which may use the channel information (i.e., the quantized version of the channel information as decoded by information decode unit 237) to compute a covariance matrix R. Alternatively, estimate covariance matrix unit 241 may use the channel information to update a covariance matrix that it has already computed. A discussion of the computing of a covariance matrix and the updating of a covariance matrix from the channel information is provided below.

The covariance matrix R as computed or updated by estimate covariance matrix unit 241 may be stored in a memory 243 for subsequent use. Although shown in FIG. 2a as separate blocks, codebook store 239 may be a part of memory 243.

BS 200 also includes a codebook adapt unit 245. Codebook adapt unit 245 may be used to adapt a codebook stored in codebook store 239 based on operating conditions of the communications system, thereby producing an adapted codebook. For example, codebook adapt unit 245 may make use of the covariance matrix R stored in memory 243 to adapt the codebook stored in codebook store 239. According an embodiment, codebook adapt unit 245 may periodically adapt the codebook stored in codebook store 239 and store the adapted codebook in codebook store 239. According to an alternative embodiment, codebook adapt unit 245 may adapt the codebook stored in codebook store 239 whenever an operating requiring the adapted codebook is performed, such as channel information decoding by information decode unit 237 or computing or updating the covariance matrix R by estimate covariance matrix unit 241. Adapting the codebook as needed may help to produce a reduction in storage requirements of BS 200.

BS 200 also includes an update unit 247. Update unit 247 may be used to provide information regarding the covariance matrix R as computed or updated by BS 200 to the MSs. As an example, update unit 247 may periodically provide information regarding the covariance matrix R to the MSs. Alternatively, update unit 247 may update the MSs when update unit 247 detects a significant change to the covariance matrix R, wherein a significant change may be defined as a change in the covariance matrix R exceeding a specified threshold. To help reduce overhead, update unit 247 may be configured to perform update only when bandwidth is available, such as when there are already scheduled transmissions to the MSs, when data buffers to the MSs are not full, or so on.

Collectively, information decode unit 237, codebook store 239, estimate covariance matrix unit 241, codebook adapt unit 245, and update unit 247 may form a feedback information compute unit 248 that may be responsible for decoding feedback information from MSs, estimate covariance matrix R (or other channel information and channel statistics) from the feedback information received from the MSs, adapt a codebook used for codebook quantization, and synchronize codebooks used at BS 200 and the MSs.

Figure 2B:
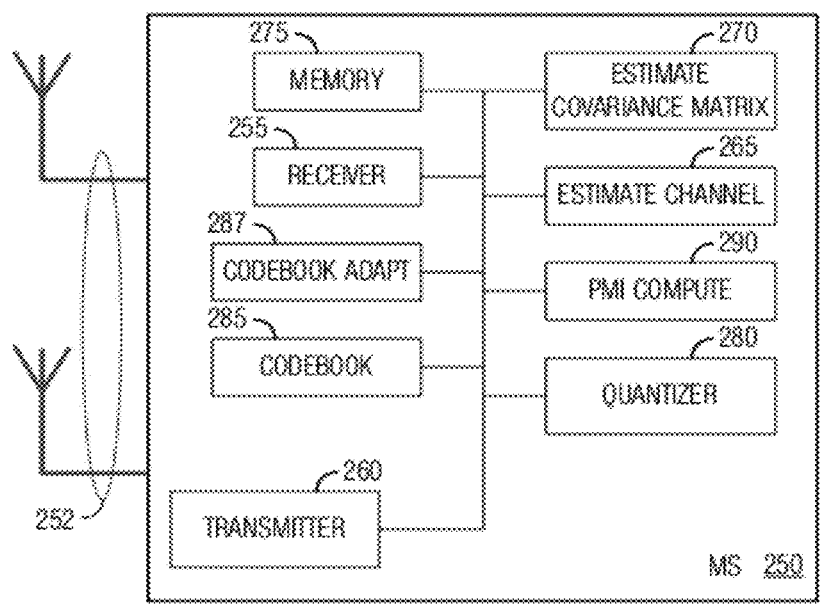
FIG. 2b is a diagram of a MS.

FIG. 2b illustrates a MS 250. MS 250 may have one or a plurality of receive antennas 252, connecting through RF circuitry (not shown) to a receiver 255 and a transmitter 260. Although MS 250 is shown to have two antennas, MS 250 may have any number of antennas, such as one, two, three, and so forth, antennas. Furthermore, a first subset of antennas 252 may be used to receive and a second subset of antennas 252 may be used to transmit, with a number of receive antennas which may not necessarily be equal to a number of transmit antennas.

MS 250 includes an estimate channel unit 265, which may use information inserted into the transmit signal in the form of training signals, training pilots, or a structure in the transmitted signal such as cyclostationarity to estimate coefficients of the channel between BS 200 and MS 250, i.e., perform channel estimation.

The output of estimate channel unit 265 (channel information, for example) may be provided to estimate covariance matrix R unit 270. Estimate covariance matrix R unit 270 may make use of the channel estimate produced by estimate channel unit 265 to compute the covariance matrix R, which may be stored in a memory 275.

MS 250 also includes a quantizer 280 that may use codebook quantization to quantize channel information produced by estimate channel unit 265. Quantizer 280 may use a codebook stored in a codebook store 285 to quantize the channel information and produce a codeword index corresponding to a codeword that optimizes a codeword selection function. According to an embodiment, the codebook used by quantizer 280 may be an adapted codebook that may be an adapted version of a codebook stored in codebook store 285.

The adapted codebook may be adapted to operating conditions of MS 250 as indicated by the covariance matrix R computed by estimated covariance matrix R unit 270. Adapting the codebook may be performed by codebook adapt unit 287 using the covariance matrix R stored in memory 275. Although shown in FIG. 2b as separate blocks, codebook store 285 may be a part of memory 275.

MS 250 may also include a PMI compute unit 290 that may compute PMI based on the channel information produced by estimate channel unit 265. Transmitter 260 may be used to transmit channel information to BS 200. Channel information as transmitted by MS 250 may be in a raw form as computed by MS 250 or in encoded, quantized, and/or compressed form.

Figures 3A, 3B:
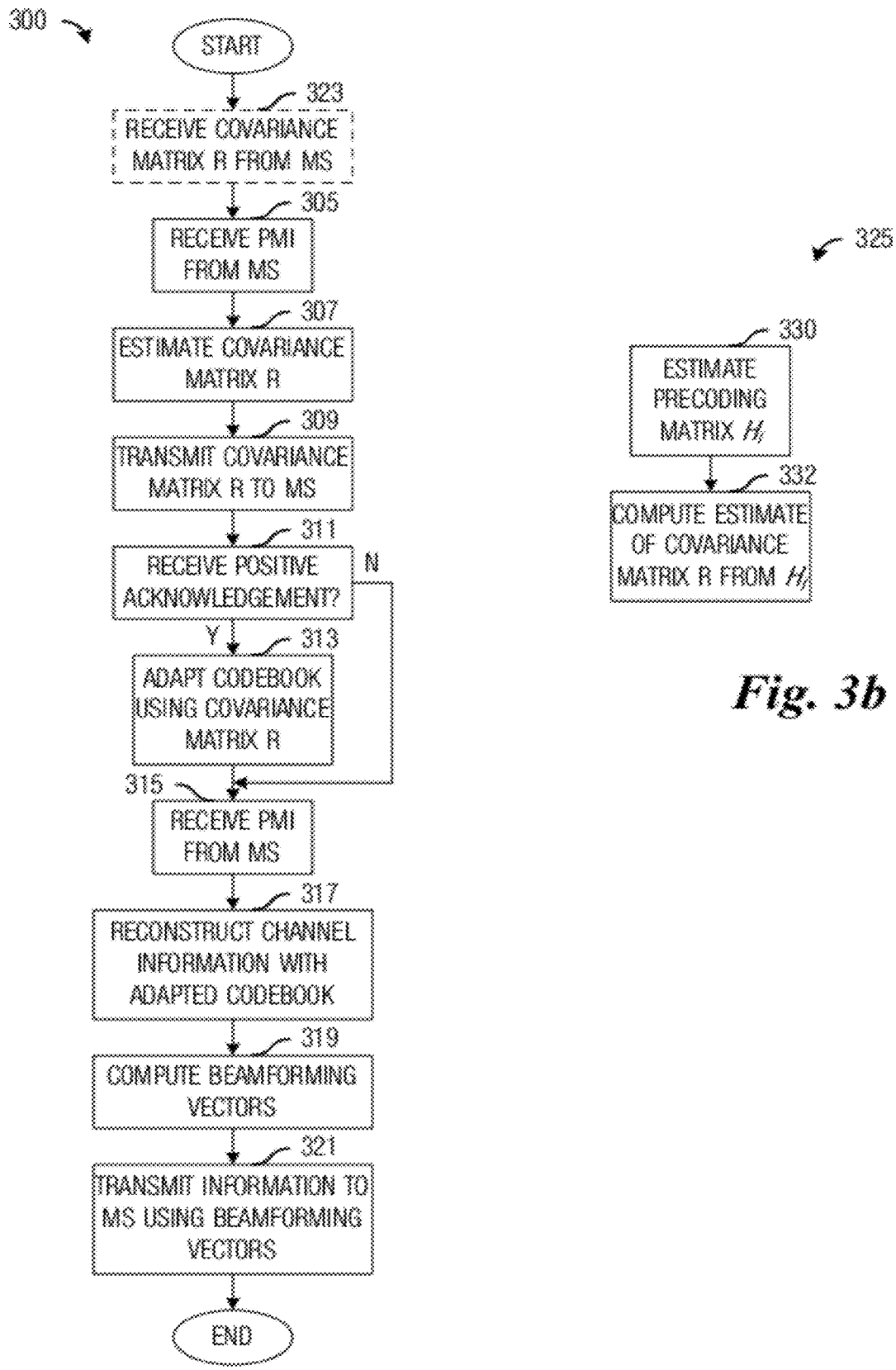
FIG. 3a is a flow diagram of BS operations in transmitting information to MSs.
FIG. 3b is a flow diagram of first BS operations in computing a covariance matrix R from PMI received from a MS.

FIG. 3a illustrates a flow diagram of BS operations 300 in transmitting information to MSs. BS operations 300 may be indicative of operations occurring in a BS, such as BS 200, as the BS transmits information to a MS, such as MS 250. The BS may make use of an adapted codebook adapted based on PMI received from the MS to reconstruct channel information, which may, in turn, be used to compute beamforming vectors to beamform the transmission to the MS. The adaptation of the codebook based on PMI may help to reduce feedback overhead, which may improve overall communications system performance. BS operations 300 may occur while the BS is in a normal operating mode and while the BS has information to transmit to the MSs.

BS operations 300 may begin with the BS receiving a feedback message from the MS (block 305). The feedback message received from the MS may contain PMI, which may be coded, compressed, quantized, or so forth. If the PMI is coded, compressed, quantized, or so on, the BS may need to reconstruct the PMI. The BS may utilize the PMI (or the reconstructed PMI) to compute an estimate of a covariance matrix R for a channel between the BS and the MS (block 307). According to an embodiment, the BS may use the PMI to compute the covariance matrix R or update an existing covariance matrix R. A discussion of the computing and/or updating of the covariance matrix R from the PMI is provided below.

The BS may transmit the covariance matrix R to the MS (block 309). Generally, in a communications system, the spectral efficiency of a DL is higher than that of an UL. Therefore, the transmission of the covariance matrix R on a DL may consume less resources and have a smaller impact on the performance of the communications system.

The BS may or may not transmit the covariance matrix R to the MS based on a number of factors. For example, if a level of change in successive computations or updates of the covariance matrix R is smaller than a threshold, then the BS may elect to not transmit the covariance matrix R to the MS. Alternatively, if there is no data already in an output buffer for the MS, i.e., there is not already a transmission destined for the MS scheduled, then the BS may elect to not transmit the covariance matrix R to the MS. Furthermore, the BS may elect to not transmit the covariance matrix R to the MS if there is a lack of DL resources available for transmission. A combination of the above discussed factors may also cause the BS to not transmit the covariance matrix R to the MS.

The BS may receive an acknowledgement from the MS that indicates a result of a decoding of the transmission containing the covariance matrix R (block 311). If the MS was successful in its decoding of the transmission containing the covariance matrix R, then the MS may transmit a positive acknowledgement to the BS. However, if the MS was not successful in its decoding of the transmission containing the covariance matrix R, then the MS may transmit a negative acknowledgement to the BS.

The BS may perform a check to determine if it has received a positive acknowledgement from the MS (block 311). If the BS received a positive acknowledgement, then the BS may adapt a codebook stored in its codebook store using the covariance matrix R (block 313). Adapting the codebook may involve multiplying the codebook with the covariance matrix R, e.g., $W_{adapted} = RW_{base}$, where $W_{adapted}$ is the adapted codebook, R is the covariance matrix, and $W_{base}$ is the codebook. According to an embodiment, the BS may adapt only the codebook stored in the codebook store. According to an alternative embodiment, the BS may adapt a previously adapted codebook.

If the BS received a negative acknowledgement, the BS may not adapt the codebook using the covariance matrix R. If the BS has previously adapted the codebook, then the BS may continue to use the previously adapted codebook. If the BS has not previously adapted the codebook, then the BS may continue to use the codebook (i.e., the codebook in unadapted form).

According to an embodiment, the BS may adapt the codebook after it has received a specified number of PMIs from the MS. According to an alternative embodiment, the BS may adapt the codebook after a specified amount of time has elapsed since the last time that the codebook has been adapted. According to yet another alternative embodiment, the BS may adapt the codebook if a level of change in the covariance matrix R exceeds a threshold.

The BS may receive a feedback message from the MS (block 315). According to an embodiment, the feedback message may contain PMI. The PMI may provide a short term representation of the channel between the BS and the MS. The PMI may be received in the form of a codeword index to a codeword in the adapted codebook that has been selected based on a codeword selection function. The BS may reconstruct the PMI based on the received codeword index (block 317). According to an embodiment, the BS may reconstruct the PMI by retrieving a codeword from the adapted codebook corresponding to the codeword index. According to an embodiment, if the codebook has not been adapted, then the codeword index may correspond to a codeword in the codebook.

The BS may compute beamforming vectors based on the reconstructed PMI (block 319). The BS may beamform a transmission intended for the MS using the beamforming vectors and transmit the beamformed transmission over a resource allocated to the MS (block 321) and BS operations 300 may terminate.

Although the discussion focuses on the computing of an estimate of a covariance matrix using PMI, other forms of channel information may be used to compute the estimate of the covariance matrix. For example, channel quality indicator (CQI) information may be used in conjunction with or separate from PMI to compute the estimate of the covariance matrix R. Therefore the discussion of the use of PMI to compute the estimate of the covariance matrix R should not be construed as being limiting to either the scope or the spirit of the embodiments. Furthermore, even though the discussion focuses on the computing of an estimate of a covariance matrix R to facilitate adapting the codebook, estimates of other forms of channel statistic may also be used to facilitate adapting the codebook. For example, an estimate of a function of a covariance matrix R may be used for adapting the codebook. Therefore the discussion of the estimate of the covariance matrix R should not be construed as being limiting to either the scope or the spirit of the embodiments.

According to an alternative embodiment, it may be possible that at some instance in time, the MS may compute a covariance matrix R based on channel statistics and report the covariance matrix R (or some form of the covariance matrix R) to the BS. The BS may receive the reported covariance matrix R (shown in FIG. 3a as an optional block 323). The reporting of the covariance matrix R to the BS by the MS may occur relatively infrequently to minimize feedback overhead. For example, a specified amount of time after the MS establishes a connection with the BS, the MS may have acquired sufficient channel information to compute the covariance matrix R and once the MS computes the covariance matrix R, the MS may report the covariance matrix R or some form of the covariance matrix R to the BS. From that point on, the MS may simply report PMI (or CQI or some other channel information) to the BS so that the BS may update the covariance matrix R. In order to maintain consistent copies of the covariance matrix R, the MS may also update the covariance matrix R.

FIG. 3b illustrates a flow diagram of first BS operations 325 in computing a covariance matrix R from PMI received from a MS. BS operations 325 may be indicative of operations occurring in a BS, such as BS 200, as the BS computes a covariance matrix R from PMI received from a MS, such as MS 250. BS operations 325 may be an embodiment of estimating a covariance matrix R, block 307 of FIG. 3a.

BS operations 325 may begin with the BS estimating a precoding matrix $\tilde{H}_i$ (block 330). The precoding matrix $\tilde{H}_i$ may be derived from $PMI_i$, an i-th PMI received from the MS. The covariance matrix R may then be computed using expression $$\tilde{R} = \frac{1}{N} \sum_{i=1}^{N} \tilde{H}_i \tilde{H}_i^*, \qquad (1)$$

where $\tilde{R}$ is an estimate of the covariance matrix R, N is a number of PMIs used to estimate R, $\tilde{H}_i$ is the i-th precoding matrix computed from the i-th PMI received from the MS, and $\tilde{H}_i^*$ is the Hermitian of $\tilde{H}_i$ (block 332). BS operations 325 may then terminate.

Equation (1) used to compute the covariance matrix R may also be used to update the covariance matrix R as additional PMIs are received from the MS. Variations to Equation (1) may be possible and it may be up to the BS to decide how to estimate the covariance matrix R. Whichever technique is used to estimate the covariance matrix R, if the information of the covariance matrix R is not exchanged between the BS and the MS, it is crucial that both the BS and the MS utilize the same technique to ensure that the same covariance matrix R is available at the BS and the MS.

Figures 3C, 4:
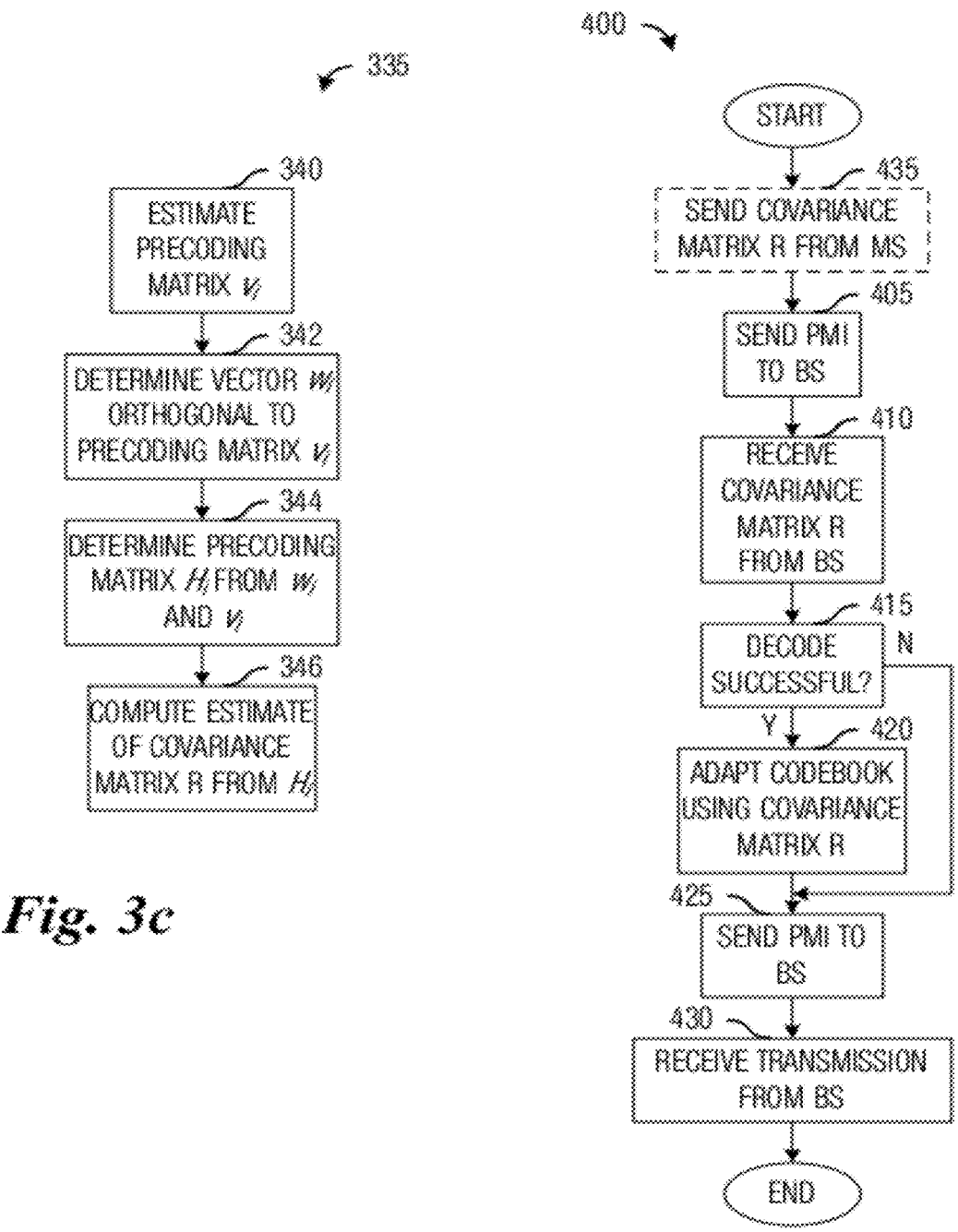
FIG. 3c is a flow diagram of second BS operations in computing a covariance matrix R from PMI received from a MS.
FIG. 4 is a flow diagram of MS operations in receiving a transmission from a BS.

FIG. 3c illustrates a flow diagram of second BS operations 335 in computing a covariance matrix R from PMI received from a MS. BS operations 335 may be indicative of operations occurring in a BS, such as BS 200, as the BS computes a covariance matrix R from PMI received from a MS, such as MS 250. BS operations 335 may be an embodiment of estimating a covariance matrix R, block 307 of FIG. 3a.

If a majority of PMI received from the MS is rank-1 PMI, then it may be possible that an adapted codebook based on the covariance matrix R computed using Equation (1) will only cover a relatively narrow direction of a spatial channel. Additional procedures may be necessary to avoid an excessively narrow covariance matrix R.

BS operations 335 may begin with the BS estimating a precoding matrix $v_i$ (block 340). Precoding matrix $v_i$ may be a rank-1 precoding matrix that is based on the i-th PMI received from the MS. From the precoding matrix $v_i$, the BS may determine a vector $w_i$ that is orthogonal to the precoding matrix $v_i$ (block 342).

The BS may determine a precoding matrix $\tilde{H}_i$ by combining $v_i$ and $w_i$ together, e.g., $\tilde{H}_i = [k \cdot v_i \; w_i]$, where k is a scalar (block 344). The BS may then compute the covariance matrix R by evaluating $$\tilde{R} = \frac{1}{N} \sum_{i=1}^{N} \tilde{H}_i \tilde{H}_i^*,$$

where $\tilde{H}_i$ is $\tilde{H}_i = [k \cdot v_i \; w_i]$. BS operations 335 may then terminate.

FIG. 4 illustrates a flow diagram of MS operations 400 in receiving a transmission from a BS. MS operations 400 may be indicative of operations occurring at a MS, such as MS 250, as the MS receives a transmission from a BS, such as BS 200, wherein the MS and the BS are operating in a communications system. The transmission received from the BS may be beamformed using beamforming vectors computed from channel information provided by the MS, wherein the channel information is fedback to the BS in a quantized form using codebook quantization. The codebook quantization may make use of adapted codebooks adapted using PMI, which may help to reduce feedback overhead. MS operations 400 may occur while the MS is in a normal operating mode and while the BS is serving the MS.

MS operations 400 may begin with the MS sending a feedback message to the BS (block 405). According to an embodiment, the feedback message may contain PMI. The MS may provide the PMI to the BS at regular intervals as specified by the BS, a technical standard specification, in response to receiving an instruction from the BS, or a combination thereof.

Depending on configuration of the communications system, the MS may receive a transmission from the BS (block 410). According to an embodiment, the transmission from the BS may contain information related to a covariance matrix R computed by the BS based on the PMI transmitted to the BS by the MS. The transmission may contain the covariance matrix R, a difference between an earlier covariance matrix R and the covariance matrix R, a compressed or quantized covariance matrix R, or so forth. A frequency of the transmissions from the BS containing information related to the covariance matrix R may be based on factors such as changes in the covariance matrix R, scheduled transmissions to the MS, available bandwidth in the communications system, and so forth.

In order to make use of the information related to the covariance matrix R, the MS may need to decode the transmission. If the MS was able to successfully decode the transmission (block 415), then the MS may adapt a codebook using the covariance matrix R (block 420). However, if the MS was not able to successfully decode the transmission (block 415), then the MS may continue to make use of the previously adapted codebook (or the codebook if no previously adapted codebook exists). The MS may inform the BS of its success or failure in decoding the transmission with a positive or negative acknowledgement.

The MS may send a message to the BS, the message containing PMI (block 425). The PMI may be quantized using the adapted codebook and the message may include a codeword index corresponding to a codeword in the adapted codebook selected by a codeword selection function. The MS may receive a transmission from the BS, wherein the transmission has been beamformed using beamforming vectors computed from the PMI quantized using adapted codebooks (block 430). MS operations 400 may then terminate.

According to an alternative embodiment, it may be possible that at some instance in time, the MS may compute a covariance matrix R based on channel statistics and report the covariance matrix R (or some form of the covariance matrix R) to the BS (shown in FIG. 4 as an optional block 435). The reporting of the covariance matrix R to the BS by the MS may occur relatively infrequently to minimize feedback overhead. For example, a specified amount of time after the MS establishes a connection with the BS, the MS may have acquired sufficient channel information to compute the covariance matrix R and once the MS computes the covariance matrix R, the MS may report the covariance matrix R or some form of the covariance matrix R to the BS. From that point on, the MS may simply report PMI (or CQI or some other channel information) to the BS so that the BS may update the covariance matrix R. In order to maintain consistent copies of the covariance matrix R, the MS may also update the covariance matrix R.

Figure 5:
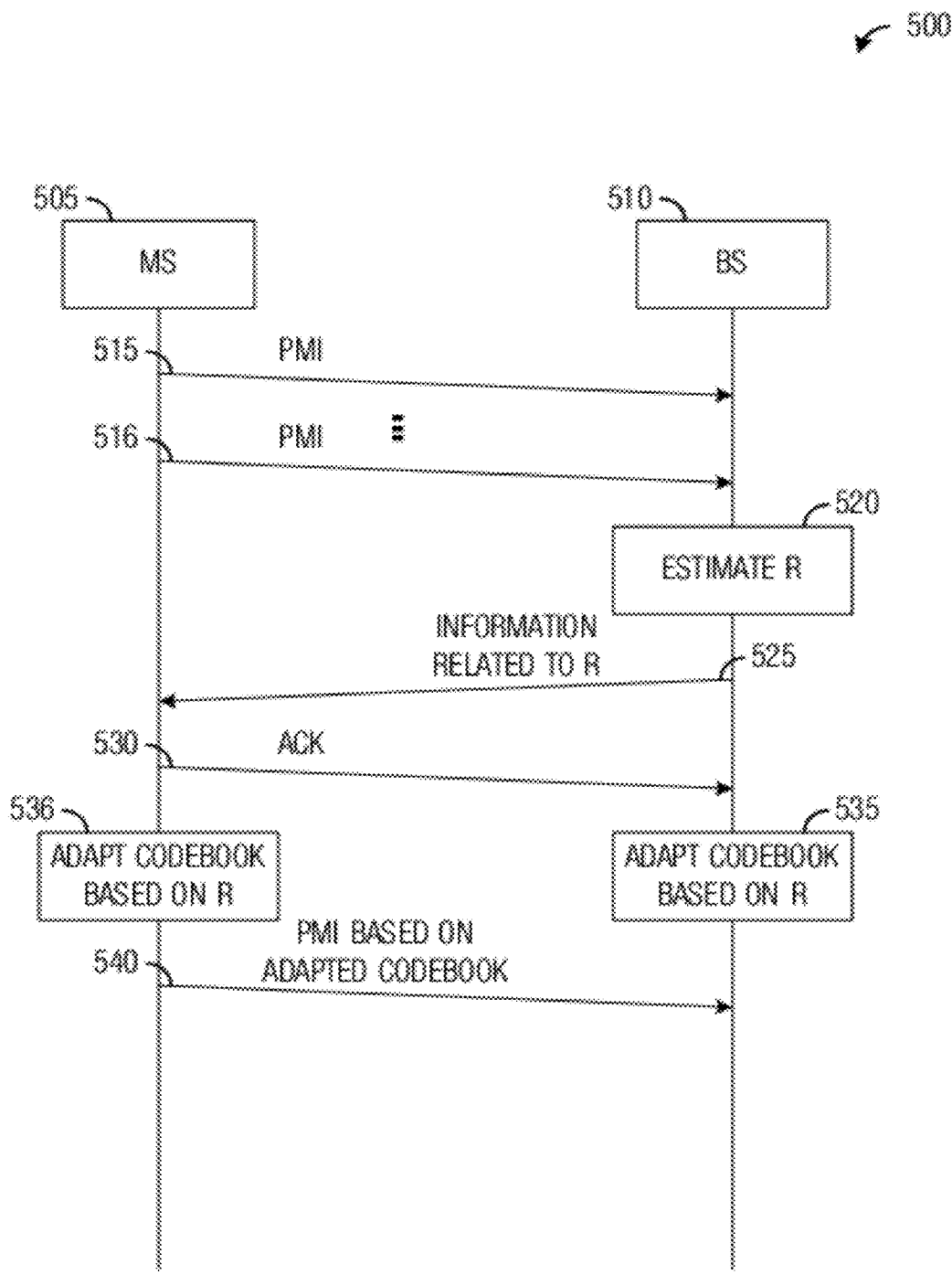
FIG. 5 is a diagram of an operations sequence between a MS and a BS.

FIG. 5 illustrates an operations sequence 500 between a MS and a BS. Operations sequence 500 may be indicative of operations (computations and/or messages) performed in a providing of feedback information from a MS 505 to a BS 510. Operations sequence 500 may begin with MS 505 transmitting PMI to BS 510 (shown as events 515 and 516). The PMI transmissions may occur over time with other operations occurring but not shown.

After BS 510 receives a number of PMI transmissions from MS 505, BS 510 may estimate a covariance matrix R based on the received PMI transmissions (shown as event 520).

According to an embodiment, the estimation of the covariance matrix R using PMI may be performed by evaluating $$\tilde{R} = \frac{1}{N}\sum_{i=1}^{N} \tilde{H}_i \tilde{H}_i^*,$$

where $\tilde{R}$ is an estimate of the covariance matrix R, N is a number of PMIs used to estimate R, $\tilde{H}_i$ is the i-th precoding matrix computed from the i-th PMI received from the MS, and $\tilde{H}_i^*$ is the Hermitian of $\tilde{H}_i$.

After estimating the covariance matrix R, BS 510 may need to ensure that MS 505 also has the same covariance matrix R. BS 510 may transmit a message containing information related to the estimated covariance matrix R to MS 505 (shown as event 525). MS 505 may decode the transmission and send back to BS 510 either a positive or negative acknowledgement based on its ability to decode the transmission. For discussion purposes, let MS 505 successfully decode the transmission and a positive acknowledgement is transmitted to BS 510 (shown as event 530).

Both MS 505 and BS 510 may then adapt a codebook using the estimated covariance matrix R (shown as events 535 and 536). Since the estimated covariance matrix R is the same at both MS 505 and BS 510 and a codebook used in the adapting at both MS 505 and BS 510 are the same, the adapted codebooks are also the same. In order to maximize performance, both adapted codebooks must be substantially identical to prevent mismatch. MS 505 may then transmit PMI to BS 510, wherein the PMI is quantized using the adapted codebook (shown as event 540).

FIG. 6 illustrates a flow diagram of BS operations 600 in transmitting information to MSs. BS operations 600 may be indicative of operations occurring in a BS, such as BS 200, as the BS transmits information to a MS, such as MS 250. The BS may make use of an adapted codebook adapted based on PMI received from the MS to reconstruct channel information, which may, in turn, be used to compute beamforming vectors to beamform the transmission to the MS. The adaptation of the codebook based on PMI may help to reduce feedback overhead, which may improve overall communications system performance. BS operations 600 may occur while the BS is in a normal operating mode and while the BS has information to transmit to the MSs.

BS operations 600 may begin with a sharing of rules and times between the BS and the MS (block 605). The rules and times may be used to specify when to perform an adaptation of the codebook, when to synchronize covariance matrix R, and so forth. The rules and times may be useful in helping to ensure that the covariance matrix R used at the BS and the MS remain substantially identical. For example, the MS and the BS may agree upon the time when the new estimation of covariance matrix R will be used to adapt the codebook such that they are in synchrony regarding the codebook used for quantization. The agreed upon time may be, for example, based on a specified period, such that both the MS and the BS will adapt their respective codebooks at a specific regular time interval.

The BS may receive a feedback message from the MS (block 610). The feedback message received from the MS may contain PMI, which may be coded, compressed, quantized, or so forth. If the PMI is coded, compressed, quantized, or so on, the BS may need to reconstruct the PMI. The BS may utilize the PMI (or the reconstructed PMI) to compute an estimate of a covariance matrix R for a channel between the BS and the MS (block 615). According to an embodiment, the BS may use the PMI to compute the covariance matrix R or update an existing covariance matrix R. The computing and/or updating of the covariance matrix R may proceed as previously described.

The BS may perform a check to determine if it is time to adapt the codebook (block 620). The time to adapt the codebook may be specified in the rules and times shared earlier with the MS. If it is time to adapt the codebook, then the BS may adapt the codebook using the covariance matrix R (block 625). If it is not time to adapt the codebook, then the BS may continue to use a previously adapted codebook or the codebook if the codebook has not been previously adapted.

The BS may perform a check to determine if it is time to synchronize the covariance matrix R with the MS (block 630). The time to synchronize the covariance matrix R may be specified in the rules and times shared earlier with the MS. If it is time to synchronize the covariance matrix R, then the BS may send a message containing information related to the covariance matrix R to the MS (block 635). If it is not time to synchronize the covariance matrix R, then the BS may continue without updating the MS.

The BS may receive a feedback message from the MS (block 640). According to an embodiment, the feedback message may contain PMI. The PMI may be received in the form of a codeword index to a codeword in the adapted codebook that has been selected based on a codeword selection function. The BS may reconstruct the PMI based on the received codeword index (block 645). According to an embodiment, the BS may reconstruct the PMI by retrieving a codeword from the adapted codebook corresponding to the codeword index. According to an embodiment, if the codebook has not been adapted, then the codeword index may correspond to a codeword in the codebook.

The BS may compute beamforming vectors based on the reconstructed PMI (block 650). The BS may beamform a transmission intended for the MS using the beamforming vectors and transmit the beamformed transmission over a resource allocated to the MS (block 655) and BS operations 600 may terminate.

According to an alternative embodiment, it may be possible that at some instance in time, the MS may compute a covariance matrix R based on channel statistics and report the covariance matrix R (or some form of the covariance matrix R) to the BS. The BS may receive the reported covariance matrix R. The reporting of the covariance matrix R to the BS by the MS may occur relatively infrequently to minimize feedback overhead. For example, a specified amount of time after the MS establishes a connection with the BS, the MS may have acquired sufficient channel information to compute the covariance matrix R and once the MS computes the covariance matrix R, the MS may report the covariance matrix R or some form of the covariance matrix R to the BS. From that point on, the MS may simply report PMI (or CQI or some other channel information) to the BS so that the BS may update the covariance matrix R. In order to maintain consistent copies of the covariance matrix R, the MS may also update the covariance matrix R.

FIG. 7 illustrates a flow diagram of MS operations 700 in receiving a transmission from a BS. MS operations 700 may be indicative of operations occurring at a MS, such as MS 250, as the MS receives a transmission from a BS, such as BS 200, wherein the MS and the BS are operating in a communications system. The transmission received from the BS may be beamformed using beamforming vectors computed from channel information provided by the MS, wherein the channel information is fedback to the BS in a quantized form using codebook quantization. The codebook quantization may make use of adapted codebooks adapted using PMI, which may help to reduce feedback overhead. MS operations 700 may occur while the MS is in a normal operating mode and while the BS is serving the MS.

MS operations 700 may begin with a sharing of rules and times between the BS and the MS (block 705). The rules and times may be used to specify when to perform an adaptation of the codebook, when to synchronize covariance matrix R, and so forth. The rules and times may be useful in helping to ensure that the covariance matrix R used at the BS and the MS remain substantially identical. For example, the MS and the BS may agree upon the time when the new estimation of covariance matrix R will be used to adapt the codebook such that they are in synchrony regarding the codebook used for quantization. The agreed upon time may be, for example, based on a specified period, such that both the MS and the BS will adapt their respective codebooks at a specific regular time interval.

The MS may send a feedback message to the BS (block 710). According to an embodiment, the feedback message may contain PMI. The MS may provide the PMI to the BS at regular intervals as specified by the BS, a technical standard specification, or both.

The MS may also estimate a covariance matrix for a channel between the BS and MS from the PMI (block 715). According to an embodiment, the BS may use the PMI to compute the covariance matrix R or update an existing covariance matrix R. The computing and/or updating of the covariance matrix R may proceed as previously described.

The MS may perform a check to determine if it is time to adapt the codebook (block 720). The time to adapt the codebook may be specified in the rules and times shared earlier with the BS. If it is time to adapt the codebook, then the MS may adapt the codebook using the covariance matrix R (block 725). If it is not time to adapt the codebook, then the MS may continue to use a previously adapted codebook or the codebook if the codebook has not been previously adapted.

The MS may perform a check to determine if it has received a transmission from the BS containing information related to a covariance matrix R estimated by the BS (block 730). If the MS has received such a message, the MS may update its own estimated covariance matrix R to ensure that the estimated covariance matrix R used at the MS and the BS are substantially identical (block 735). If the MS has not received such a message, then the MS may continue without updating the estimated covariance matrix R.

The MS may send a feedback message to the BS (block 740). The feedback message may contain PMI that has been quantized using the adapted codebook (or the codebook if the codebook has not been adapted), i.e., a codeword index. The MS may receive a transmission from the BS, wherein the transmission has been beamformed using beamforming vectors computed from the PMI quantized using adapted codebooks (block 745). MS operations 700 may then terminate.

According to an alternative embodiment, it may be possible that at some instance in time, the MS may compute a covariance matrix R based on channel statistics and report the covariance matrix R (or some form of the covariance matrix R) to the BS. The reporting of the covariance matrix R to the BS by the MS may occur relatively infrequently to minimize feedback overhead. For example, a specified amount of time after the MS establishes a connection with the BS, the MS may have acquired sufficient channel information to compute the covariance matrix R and once the MS computes the covariance matrix R, the MS may report the covariance matrix R or some form of the covariance matrix R to the BS. From that point on, the MS may simply report PMI (or CQI or some other channel information) to the BS so that the BS may update the covariance matrix R. In order to maintain consistent copies of the covariance matrix R, the MS may also update the covariance matrix R.

Figure 8:
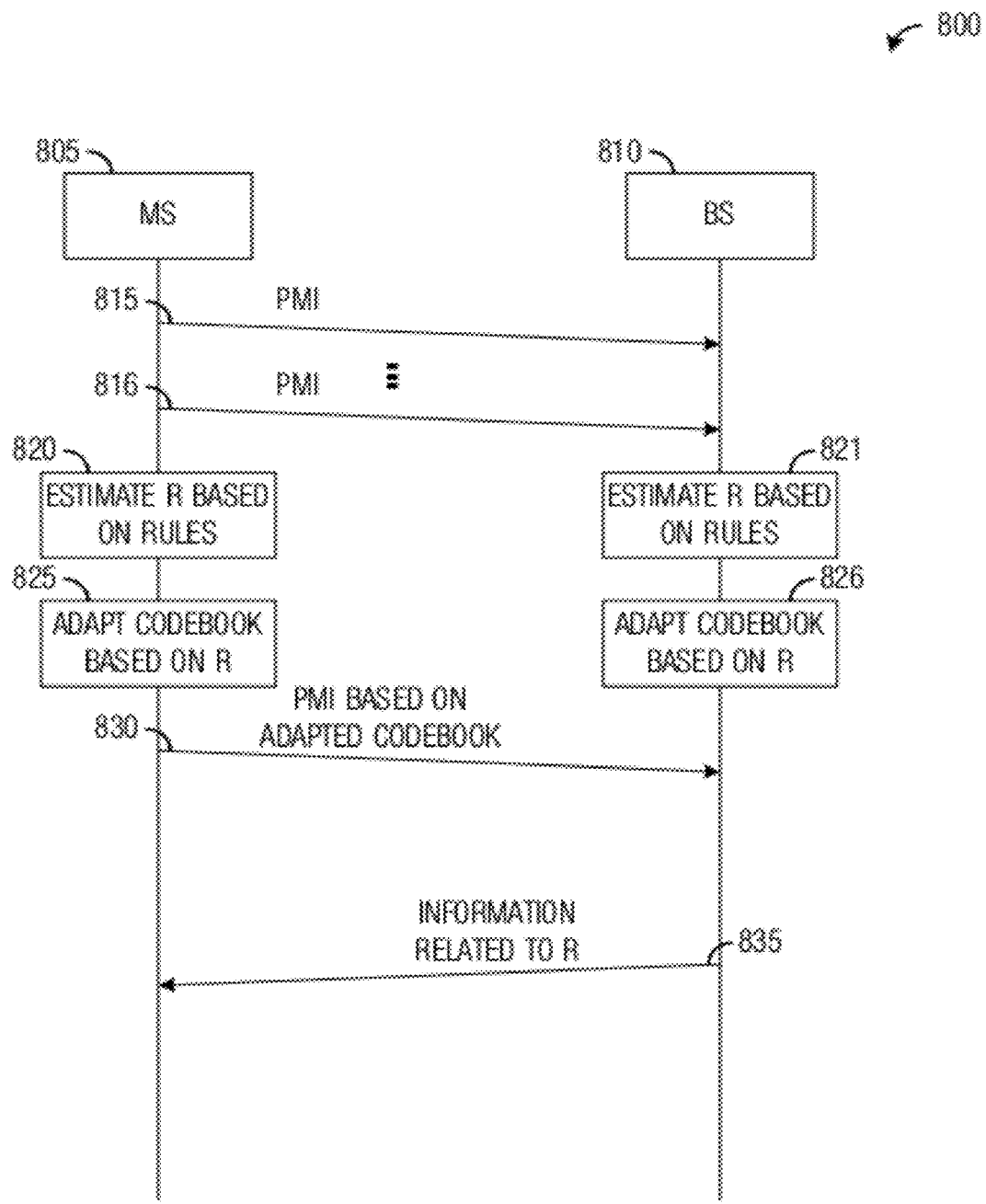
FIG. 8 is a diagram of an operations sequence between a MS and a BS.

FIG. 8 illustrates an operations sequence 800 between a MS and a BS. Operations sequence 800 may be indicative of operations (computations and/or messages) performed in a providing of feedback information from a MS 805 to a BS 810. Operations sequence 800 may begin with MS 805 transmitting PMI to BS 810 (shown as events 815 and 816). The PMI transmissions may occur over time with other operations occurring but not shown.

MS 805 and BS 810 may, at a specified time that is known to both MS 805 and BS 810, estimate a covariance matrix R based on PMI (shown as events 820 and 821). MS 805 may utilize PMI that it has generated and BS 810 may use PMI that it has received in transmissions from MS 805. According to an embodiment, the estimation of the covariance matrix R using PMI may be performed by evaluating $$\tilde{R} = \frac{1}{N}\sum_{i=1}^{N} \tilde{H}_i \tilde{H}_i^*,$$

where $\tilde{R}$ is an estimate of the covariance matrix R, N is a number of PMIs used to estimate R, $\tilde{H}_i$ is the i-th precoding matrix computed from the i-th PMI received from the MS, and $\tilde{H}_i^*$ is the Hermitian of $\tilde{H}_i$.

After estimating the covariance matrix R, MS 805 and BS 810 may adapt a codebook using the covariance matrix R (shown as events 825 and 826). MS 805 may then transmit PMI to BS 810, wherein the PMI is quantized using the adapted codebook (shown as event 830). At an agreed upon time, BS 810 may transmit a message containing information related to covariance matrix R to MS 805 to synchronize the covariance matrix R and ensure that both MS 805 and BS 810 are using substantially identical covariance matrix R (shown as event 835).

Figure 9A:
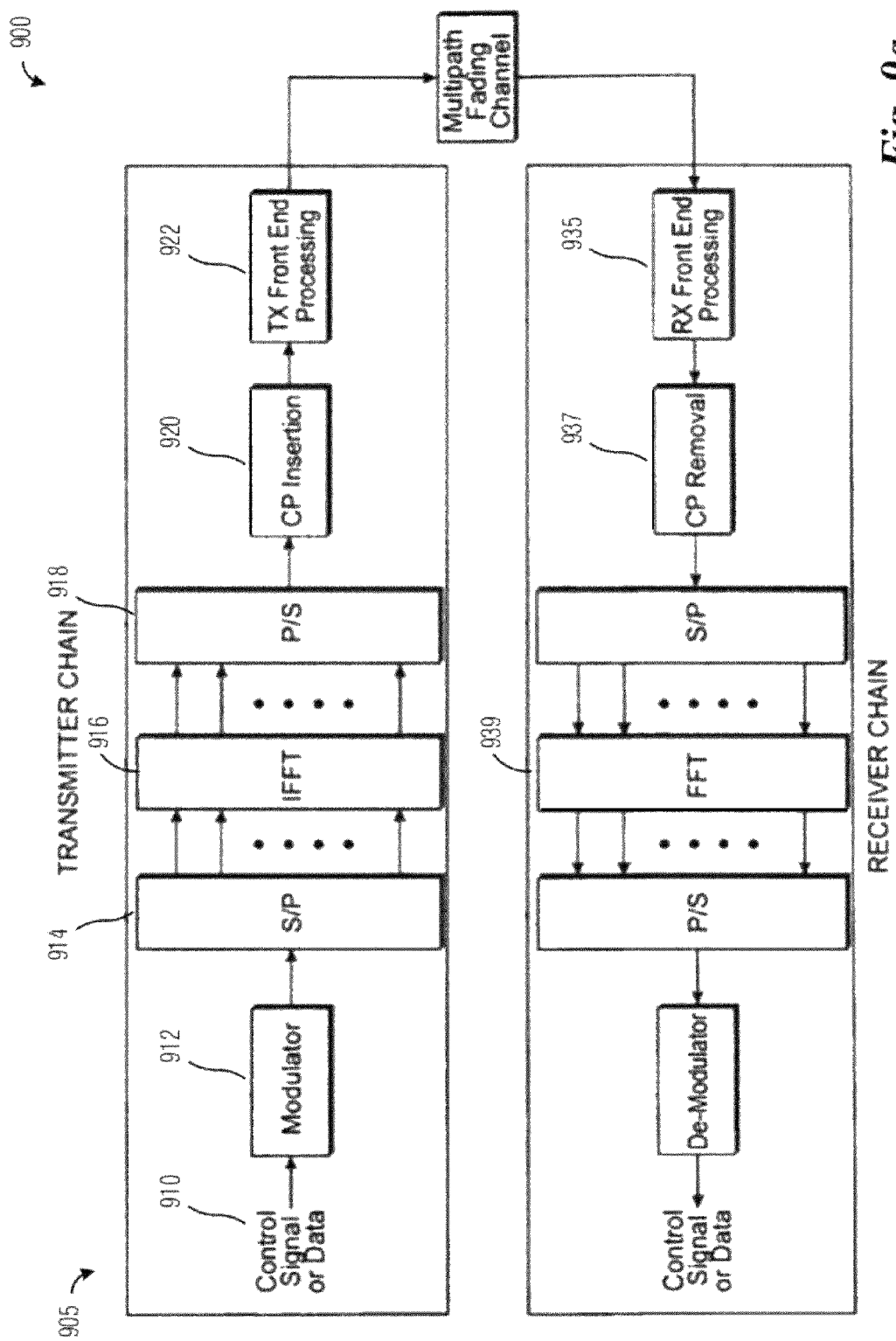
FIGS. 9a through 9e are diagrams of a communications device that utilizes codebook quantization.

FIGS. 9*a* through 9*e* illustrate a communications device that utilizes codebook quantization. FIG. 9*a* illustrates an Orthogonal Frequency Division Multiplexing (OFDM) transceiver chain 900. In a communication system using OFDM technology, at transmitter chain 905, control signals or data 910 is modulated by modulator 912 and is serial-to-parallel converted by Serial/Parallel (S/P) converter 914. Inverse Fast Fourier Transform (IFFT) unit 916 is used to transfer the signal from frequency domain to time domain, which is parallel-to-serial converted by Parallel/Serial (P/S) converter 918. Cyclic prefix (CP) or zero prefix (ZP) is added to each OFDM symbol by CP insertion unit 920 to avoid or mitigate the impact due to multipath fading. Consequently, the signal is transmitted by transmitter (Tx) front end processing unit 922 and at least one antenna (not shown), or fixed wire or cable. The signal is transmitted from one or more antennas driven by unit 922 via the atmosphere and is subjected to multipath fading to arrive at a receiver.

That the multipath fading channel illustrated in FIG. 9*a* refers to a transmission media (for example, atmosphere), and the multipath fading channel is not a component connected to the receiver, nor to the transmitter. At receiver chain 930, assuming perfect time and frequency synchronization are achieved, the signal received by receiver (Rx) front end processing unit 935 is processed by CP removal unit 937. Fast Fourier Transform (FFT) unit 939 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 9B:
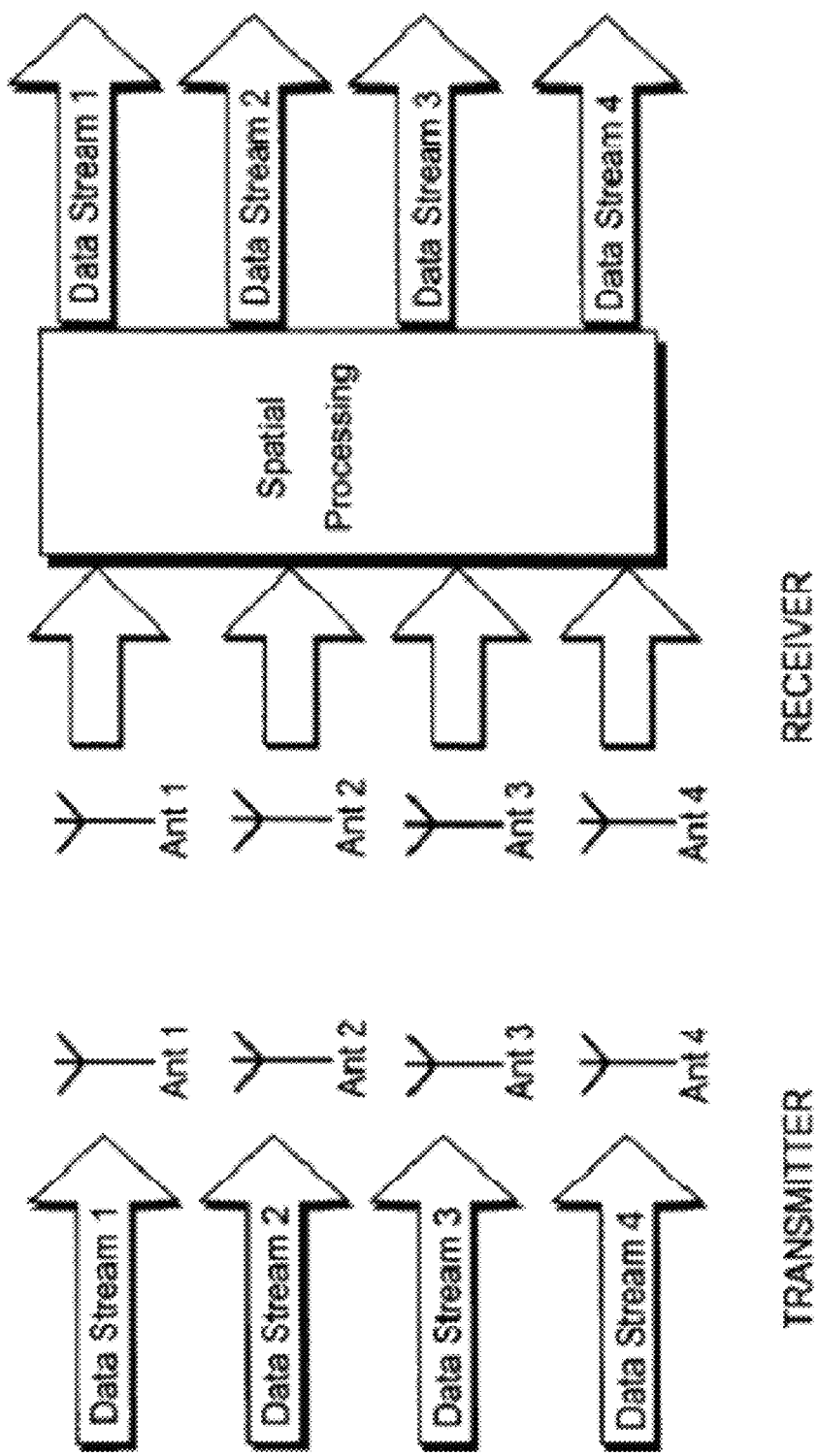

Multiple Input Multiple Output (MIMO) schemes use multiple transmission antennas and multiple receive antennas to improve the capacity and reliability of a wireless communication channel. A MIMO system promises linear increase in capacity with K where K is the minimum of number of transmit (M) and receive antennas (N), i.e., K=min(M,N). A simplified example of a 4×4 MIMO system is shown in FIG. 9b. In this example, four different data streams are transmitted separately from four transmission antennas. The transmitted signals are received at four receive antennas. Some form of spatial signal processing is performed on the received signals in order to recover the four data streams. An example of spatial signal processing is vertical Bell Laboratories Layered Space-Time (V-BLAST) which uses the successive interference cancellation principle to recover the transmitted data streams. Other variants of MIMO schemes include schemes that perform some kind of space-time coding across the transmission antennas (e.g., diagonal Bell Laboratories Layered Space-Time (D-BLAST)) and also beamforming schemes such as Spatial Division multiple Access (SDMA).

The MIMO channel estimation includes estimating the channel gain and phase information for links from each of the transmission antennas to each of the receive antennas. Therefore, the channel for M×N MIMO system includes an N×M matrix:

$$H = \begin{bmatrix} h_{11} & h_{12} & \ldots & h_{1M} \\ h_{21} & h_{22} & \ldots & h_{2M} \\ \vdots & \vdots & \vdots & \vdots \\ h_{N1} & h_{N2} & \ldots & h_{NM} \end{bmatrix} \quad (2)$$

where $h_{ij}$ represents the channel gain from transmission antenna j to receive antenna i. In order to enable the estimations of the elements of the MIMO channel matrix, separate pilots are transmitted from each of the transmission antennas.

Figure 9C:
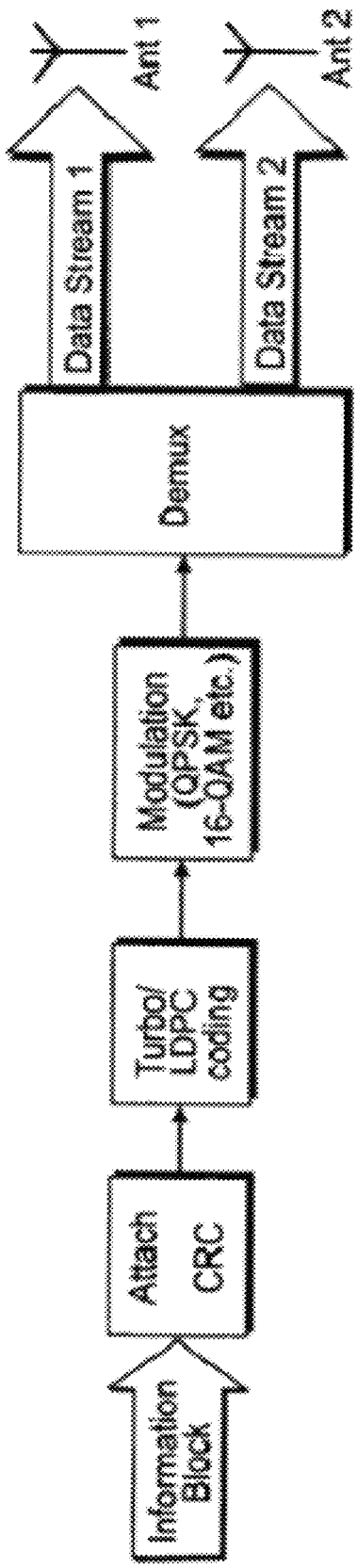

An example of single-code word MIMO scheme is given in FIG. 9c. In case of single-code word MIMO transmission, a cyclic redundancy check (CRC) is added to a single information block and then coding, for example, using turbo codes and low-density parity check (LDPC) code, and modulation, for example, by quadrature phase-shift keying (QPSK) modulation scheme, are performed. The coded and modulated symbols are then demultiplexed for transmission over multiple antennas.

Figure 9D:
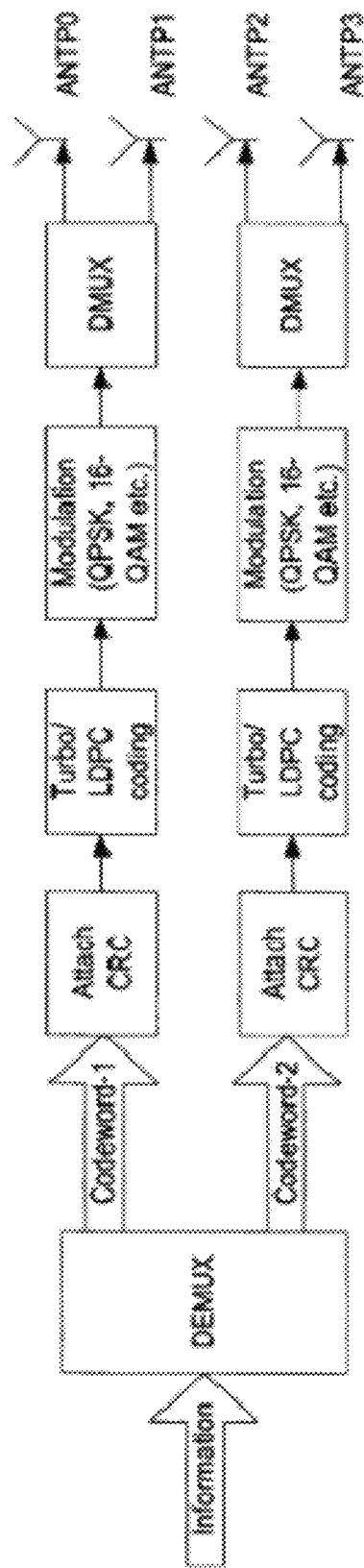
Figure 9E:
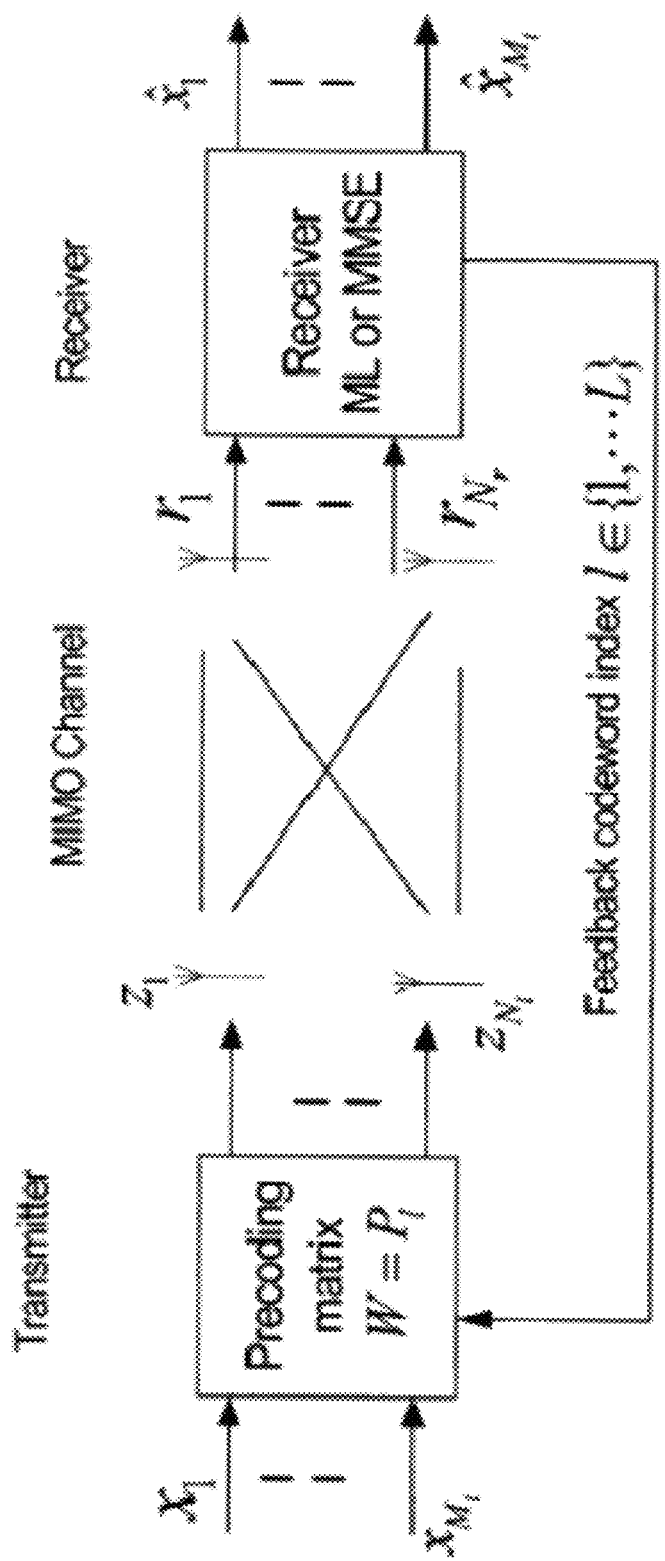

In case of multiple codeword MIMO transmission, shown in FIG. 9d, the information block is de-multiplexed into smaller information blocks. Individual CRCs are attached to these smaller information blocks and then separate coding and modulation is performed on these smaller blocks. After modulation, these smaller blocks are respectively demultiplexed into even smaller blocks and then transmitted through corresponding antennas. It should be noted that in case of multi-code word MIMO transmissions, different modulation and coding can be used on each of the individual streams, and thus resulting in a so-called Per Antenna Rate Control (PARC) scheme. Also, multi-code word transmission allows for more efficient post-decoding interference cancellation because a CRC check can be performed on each of the code words before the code word is cancelled from the overall signal. In this way, only correctly received code words are cancelled, and thus avoiding any interference propagation in the cancellation process.

In a closed-loop MIMO preceding system, for each transmission antenna size we construct a set of preceding matrices (i.e., codewords) and let this set be known at both the Node-B (i.e., the base station) and the user equipment (UE). We call this set of matrices as the "codebook" and denote it P= $\{P_1, \ldots, P_L\}$. Here $L=2^q$ denotes the size of the codebook and q is the number of (feedback) bits needed to index the codebook. In a limited feedback precoding MIMO system illustrated in FIG. 9e, once the codebook is specified for a MIMO system, the receiver observes a channel realization, selects the best precoding matrix (i.e., codeword) to be used at the moment, and feeds back the index of the codeword to the transmitter.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operations, the method comprising:
   receiving a first channel information from a communications device;
   estimating channel statistics based on the first channel information, wherein the channel statistics comprises a covariance matrix R of a channel between a controller and the communications device, or a function of the covariance matrix R;
   adapting a codebook using the channel statistics;
   receiving a second channel information from the communications device;
   constructing a precoding matrix from the second channel information and the adapted codebook; and
   transmitting information to the communications device, wherein the information is precoded using the precoding matrix.

2. The method of claim 1, further comprising transmitting information related to the channel statistics to the communications device.

3. The method of claim 2, wherein transmitting information occurs in response to determining that synchronizing conditions have been met.

4. The method of claim 3, wherein synchronizing conditions have been met when a specified number of first channel information have been received by the controller, a specified amount of time has elapsed, if the estimated channel statistics differs from previous channel statistics by more than a threshold, a transmission to the communications device has already been scheduled, sufficient resources exist on a channel between the controller to the communications device, or a combination thereof.

5. The method of claim 1, wherein estimating channel statistics occurs at a specified time.

6. The method of claim 1, wherein adapting a codebook occurs at a specified time or in response to determining that adapting conditions have been met.

7. The method of claim 6, wherein adapting conditions have been met when the estimated channel statistics differs from previous channel statistics by more than a threshold, a positive acknowledgement is received from the communications device regarding its decoding of a transmission containing information related to the channel statistics, or a combination thereof.

8. The method of claim 1, wherein estimating channel statistics comprises:
computing a precoding matrix $\tilde{H}_i$; and
evaluating $$\tilde{R} = \frac{1}{N}\sum_{i=1}^{N}\tilde{H}_i\tilde{H}_i^*,$$

where $\tilde{R}$ is an estimate of the covariance matrix R, N is a number of PMIs used to estimate R, $\tilde{H}_i$ is an i-th precoding matrix computed from an i-th PMI received from the MS, and $\tilde{H}_i^*$ is a Hermitian of $\tilde{H}_i$.

9. The method of claim 8, wherein estimating channel statistics further comprises:
computing a rank-1 precoding matrix $v_i$;
computing a vector $w_i$ that is orthogonal to the rank-1 precoding matrix $v_i$; and
evaluating $$\tilde{R} = \frac{1}{N}\sum_{i=1}^{N}\tilde{H}_i\tilde{H}_i^*,$$

where $\tilde{H}_i = [k \cdot v_i \ w_i]$, and k is a scalar.

10. The method of claim 1, wherein the first channel information is a precoding matrix indicator or a channel quality indicator.

11. The method of claim 1, wherein adapting a codebook comprises multiplying the codebook with the channel statistics.

12. The method of claim 1, further comprising receiving the channel statistic from the communications device.

13. A method for communications device operations, the method comprising:
sending a first channel information to a controller;
adapting a codebook based on a first channel statistics, wherein the channel statistics comprises a covariance matrix R of a channel between a controller and the communications device, or a function of the covariance matrix R;
sending a second channel information to the controller, wherein the second channel information is quantized using the adapted codebook; and
receiving a transmission from the controller, wherein the transmission has been precoded using a precoding matrix and an adapted codebook computed based on the first channel information.

14. The method of claim 13, further comprising receiving a transmission containing information related to channel statistics from the controller.

15. The method of claim 14, wherein adapting a codebook occurs in response to determining that the transmission was decoded successfully.

16. The method of claim 13, further comprising estimating the first channel statistics based on the first channel information.

17. The method of claim 16, further comprising updating the channel statistics based on the first channel information.

18. The method of claim 16, wherein estimating the first channel statistics occurs at a specified time.

19. The method of claim 16, wherein adapting a codebook occurs at a specified time.

20. The method of claim 16, further comprising exchanging a set of rules with the controller, and wherein estimating the first channel statistics follows the set of rules.

21. The method of claim 13, further comprising:
computing the first channel statistic; and
sending the first channel statistic to the controller.

22. A controller comprising:
a receiver coupled to an antenna, the receiver configured to receive signals detected by the antenna;
a transmitter coupled to the antenna, the transmitter configured to transmit signals using the antenna;
a feedback information compute unit coupled to the receiver, the feedback information compute unit configured to estimate channel statistics based on feedback information received from a communications device, to adapt a codebook based on the channel statistics, and to reconstruct channel information from the feedback information, wherein the channel statistics comprises a covariance matrix R of a channel between a controller and the communications device, or a function of the covariance matrix R; and
a beamforming vector unit coupled to the feedback information compute unit, the beamforming vector unit configured to compute a precoding matrix from the feedback information.

23. The controller of claim 22, wherein the feedback information compute unit comprises:
an information decode unit coupled to the receiver, the information decode unit configured to decode the feedback information, thereby producing decoded feedback information;
an estimate channel statistics unit coupled to the information decode unit, the estimate channel statistics unit configured to estimate channel statistics based on the decoded feedback information; and
a codebook adapt unit coupled to the estimate channel statistics unit, the codebook adapt unit configured to adapt the codebook using the channel statistics.

24. The controller of claim 23, wherein the feedback information compute unit further comprises an update unit coupled to the estimate channel statistics unit, the update unit configured to generate information related to the estimated channel statistics for use in updating channel statistics at the communications device.

* * * * *